(12) United States Patent
Givet

(10) Patent No.: US 6,348,685 B1
(45) Date of Patent: Feb. 19, 2002

(54) LIGHT BARRIER OPTICAL MODULE

(75) Inventor: Jean-Bernard Givet, Corenc (FR)

(73) Assignee: Schneider Electric SA, Boulogne Billancourt (FR)

( * ) Notice: Subject to any disclaimer, the term of this patent is extended or adjusted under 35 U.S.C. 154(b) by 0 days.

(21) Appl. No.: 09/266,574

(22) Filed: Mar. 11, 1999

(30) Foreign Application Priority Data

Mar. 11, 1998 (FR) .............................................. 98 02960

(51) Int. Cl.$^7$ ................................................ H01J 40/14
(52) U.S. Cl. ........................ 250/221; 250/216; 340/556
(58) Field of Search ............................. 250/221, 222.1, 250/222.2, 216, 237 R, 214 B, 214 C, 239; 340/555, 556, 557

(56) References Cited

U.S. PATENT DOCUMENTS

| | | | |
|---|---|---|---|
| 3,946,224 A | * | 3/1976 | Allera et al. ................. 250/221 |
| 4,015,122 A | | 3/1977 | Rubinstein |
| 4,751,379 A | | 6/1988 | Sasaki et al. |
| 4,774,404 A | | 9/1988 | Hasegawa et al. |

FOREIGN PATENT DOCUMENTS

| | | |
|---|---|---|
| GB | 2 211 606 | 7/1989 |
| GB | 2 300 479 | 11/1996 |

* cited by examiner

*Primary Examiner*—F L Evans
(74) *Attorney, Agent, or Firm*—Oblon, Spivak, McClelland, Maier & Neustadt, P.C.

(57) ABSTRACT

An improved light barrier optical module including a system of one or more light blocking partitions. The partitions have different sized orifices configured to reduce the effects of parasitic light rays which would otherwise interfere with the reliable operation of the module. The module is suitable for both the transmission and reception of light barrier beams and for production using injection molding.

7 Claims, 2 Drawing Sheets

LIGHT BARRIER OPTICAL MODULE

Figure 1:
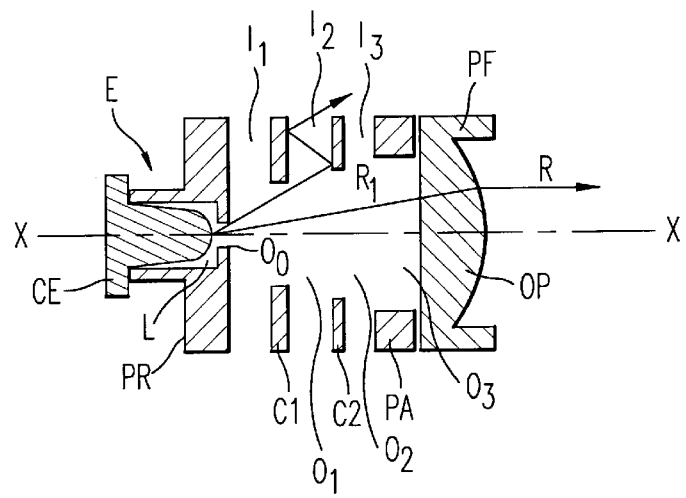

This invention relates to a light barrier optical module comprising at least one optical emission or reception element with an optoelectronic emission or reception component, together with an optical transmission device to exchange a light beam with a corresponding element in another light barrier module, to form a light barrier between them composed of at least one light beam.

There are various existing types of light barriers formed of distinct emission and reception elements assembled on each side of an area to be monitored so as to form light beams between the two modules, such that the receiving optoelectronic component emits a break signal when an obstacle (person or object) interrupts the beams. This signal then controls an action, for example switches off a machine.

These light barriers comprise optical modules each formed of several optical emission and reception elements; each emitting element cooperates with a corresponding receiving element in the other module to define a narrow light beam forming part of the optical barrier; an interruption to one or several light beams is detected and the resulting signal is used as described above.

Depending on the case, a barrier is composed of two optical modules placed at each end of the barrier. One of the modules is composed of emitters and the other is composed of receivers. It would also be possible to distribute emitters and receivers between the two modules. Finally, the barrier may be composed of a module with associated emitters and receivers, the light beams being reflected at the other end of the barrier.

Usually, optical modules include a lens associated with each optoelectronic component to give priority to part of the space, and consequently concentrate energy. This lens increases the effective area of the component and unfortunately this coupling between the emission module and the reception module or between the component and the lens introduces risks of multiple reflections widening the emitted or incident radiation in the vicinity of the lens, to exceed values predicted by geometric optical theory and correspondingly the optoelectronic emission or reception component.

Rays emitted within the optical cone that do not reach the corresponding reception lens are in principle lost rays. In practice, the situation is different because there may be multiple reflections on structures surrounding the light barrier and these multiple reflections result in incident rays reaching the optoelectronic reception component through the reception module lens, despite the relatively high angle of incidence.

It has already been proposed to attenuate the reflecting capacity (albedo) of the element in the module located at the reception. This is done by applying a non-reflecting coating on the inside surface of the orifice of the component, and forming striations or small steps to prevent multiple reflections from reaching the reception optoelectronic component. Unfortunately, these solutions are not satisfactory, either because they are not effective or because of difficulties in manufacturing them industrially.

To overcome these disadvantages, the regulations imposed specific conditions about emission and reception. Thus, the emission beam must have an aperture angle of not more than 2° for a distance of 3 meters, for a maximum security light barrier category. These conditions are not easily satisfied with existing solutions.

The purpose of this invention is to correct these disadvantages and to propose a light barrier optical module that prevents multiple reflections of emitted light beams that could get around the obstacle passing through the light barrier and which has to be detected, and by simplifying manufacture of the device, rather than further complicating it.

Consequently, the invention relates to an optical module for a light barrier of the type defined above, characterized in that the emission and/or reception element comprises a wall associated with entry of the beam into the component or its exit from the component, and provided with an orifice and in that it comprises at least one partition forming a diaphragm between the component and the optical transmission device.

Due to the orifice in the partition which forms a diaphragm between the beam entry or exit orifice in the component and the optical transmission device, both in the emission direction and in the reception direction, the optical module according to the invention is capable of eliminating parasite beams originating from reflections on parasite surfaces not located on the light beam between the light barrier emitter element and receiver element. Very schematically, the partition orifice corresponds to an orifice surrounding the cone or truncated cone joining the useful area of the optical transmission device, for example a lens, to the useful area of the component both in the interval between the partition and the lens, and between the partition and the component, in order to trap light rays at large angles of incidence, and provide the optical module with a high degree of detection reliability using simple means.

According to another characteristic of the invention, each element comprises at least two thin partitions separated from each other and from the optical transmission device and the optoelectronic component, to form at least three intervals in which parasite light rays are trapped.

Preferably, the module according to the invention comprises a body formed of a front wall and a back wall separated by at last one thin partition in which an orifice is formed, the walls and partitions being connected through spacers, the front wall being provided with a front orifice aligned on the optical center line of each element, the back wall being provided with an orifice through which the beam enters into or exits from the optoelectronic component on the center line of the element, a front panel with lenses which is fixed on the front wall, each lens being located on the center line of the element.

In particular, the module may be made by injection molding using a mold with mobile parts between which the front wall, the back wall and the partitions are defined, and these mobile parts are positioned or extracted in the direction transverse to the injection mold. The orifices in the front wall and in the intermediate partitions, and possibly in the back wall, are made using a broach. It is not difficult to extract the molded product since the shape of this broach is necessarily conical (possibly but not necessarily truncated) with the large base located at the outside. The taper on this broach is beneficially the same as the taper to be applied to the detection beam, taking account of the parameters of the optical system (lenses) of this element.

Beneficially, the module comprises attachment means in a housing.

Finally, the body comprises positioning broaches that project from its front surface and the front element equipped with lenses is provided with recesses in positions corresponding to the broaches in order to position this front element on the broach.

According to another advantageous characteristic, the module comprises 16 elements and the front wall is formed of two parts, each part being equipped with eight lenses.

Figure 2:
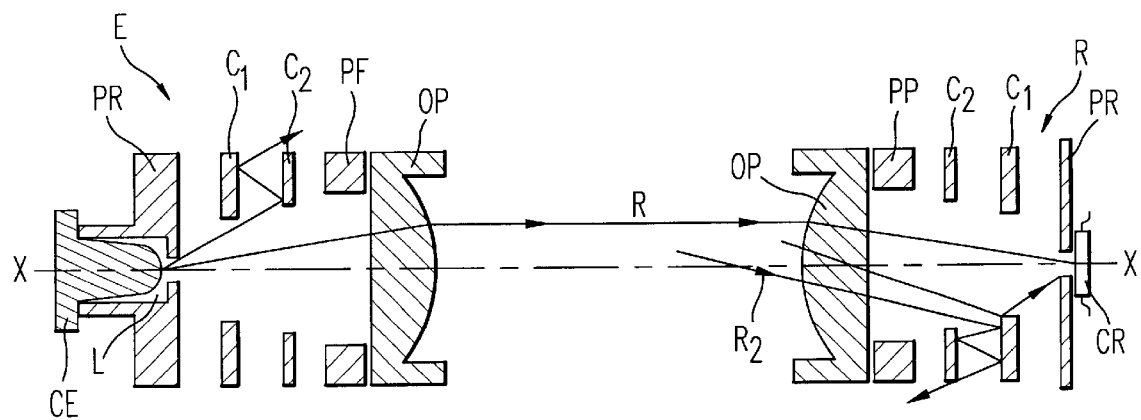
Figure 3:
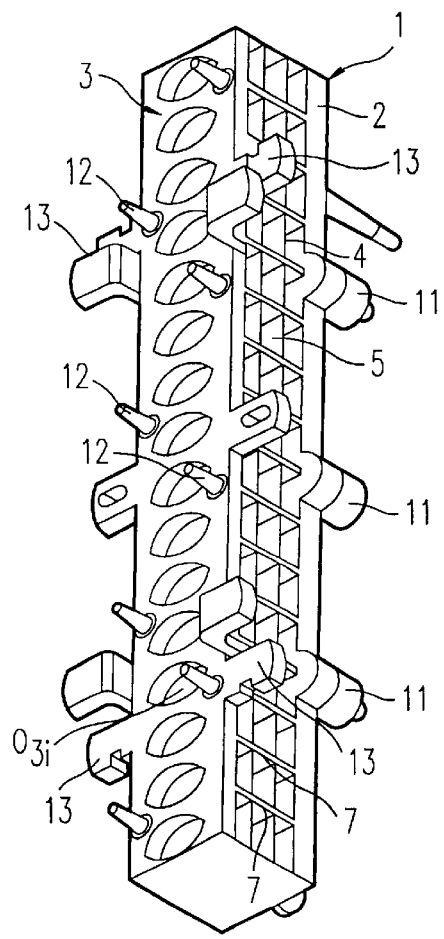
Figure 4:
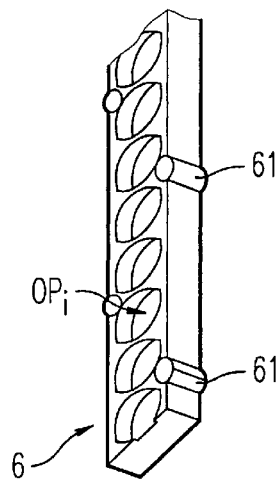
Figure 5:
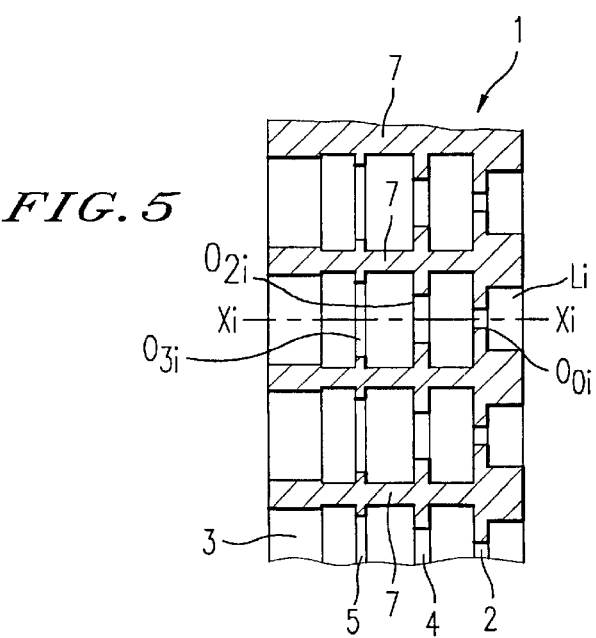

This invention will be described in more detail below with reference to the attached drawings in which:

FIG. 1 is a simplified cross-sectional view of an optical module element according to the invention, FIG. 2 is a diagrammatic view of a combination of a light emitting element and a light receiving element in two corresponding optical modules of a light barrier, FIG. 3 is a perspective view of the body of an optical module, FIG. 4 is a perspective view of the front element of an optical module, FIG. 5 is a diagrammatic axial cross-section through the optical module according to FIG. 3.

FIG. 1 shows an element of an optical module of a light barrier according to the invention. This element E is designed to emit or receive a light beam along the XX axis, and consists of a back wall PR with a recess L that will contain an optoelectronic component CE emitting light in the direction of the center line XX through an adjacent orifice $O_o$. At the front the element E comprises a front wall PA with an orifice $O_3$; in front of this front wall PA, a front wall PF with an optical transmission device OP forms a beam with ray R and axis XX. The focal length of the optical element or lens OP is such that the focal point is approximately at the orifice $O_0$ formed in the back wall PR.

First and second partitions $C_1$ and $C_2$ are formed between the back wall PR and the front wall PA, and are provided with orifices $O_1$, and $O_2$ respectively. The two orifices are centered on the XX axis. Partitions $C_1$ and $C_2$ are separated from each other and from the back wall PR and from the front wall PA to form intervals $I_1$, $I_2$, $I_3$ between them which trap light rays such as ray $R_1$ which forms an angle with respect to the XX axis which is too large for the barrier beam. This ray $R_1$ reaches the partition $C_2$ and is then returned to partition $C_1$, and is finally sent very much attenuated outwards. The material is chosen to have low reflection. Note that the orifices $O_1$, $O_2$ and $O_3$ are beneficially located on a truncated cone, the aperture angle which is defined in the design. This aperture angle is of the order of $\pm 90°$ vertically and $\pm 19°$ horizontally.

In summary element E, if it is light emitting as shown or light receiving, is capable of emitting a very concentrated beam on the XX axis.

FIG. 2 shows the combination of a light emitting element E and a light receiving element R. These two elements are distinguished simply by the nature of the component which is a light emitting component CE in the case of the emitter E and a light receiving component CR in the case of the receiving element R.

An incident ray $R_a$, which forms an excessive angle with respect to the XX axis of the beam of this light barrier element, will fall on partition $C_1$ outside orifice $O_1$ and will thus be returned to element $C_2$, and then after being reflected again on element $C_1$, will be returned very much attenuated outwards.

The only rays that can reach the light receptor component C are rays corresponding to the ray R emitted by the emitter element E. This is also true of a limiting ray R' that reaches the edge of the orifice $O_1$ which reflects it and returns it to the light receptor component CR.

FIG. 3 shows one embodiment of an optical module of a light barrier according to the invention. This optical module comprises several optical emission or reception elements as shown in FIGS. 1 and 2. These elements are placed adjacent to each other along a given direction, for example the vertical direction. Each element sends/receives a light beam along a center line such as the XX axis in FIGS. 1 and 2.

The body of the optical module shown in FIG. 1 is fitted with a front panel 6 as shown in FIG. 4.

In more detail, the optical module 1 comprises a back wall 2 similar to the back wall PR in FIG. 1, but with one recess L for each electro-optical element (emitter E, receiver R). Electricity power supply means and signal transmission lines have not been shown.

At the front, module 1 comprises a front wall 3 similar to the front wall PA in FIG. 1, but with one orifice $O_{3i}$ for each optical axes (not shown) corresponding to light beams in the light barrier. In the example shown in FIG. 3, the number of orifices $O_{3i}$ is equal to 16 since this module includes a light barrier with 16 beams. These beams are parallel and superposed vertically.

The body comprises two thin partitions 4, 5 between the back wall 2 and the front wall 3, separated from each other and with orifices $O_1$, $O_2$ on the center line. Partitions 4, 5 are connected to each other and to walls 2, 3, through spacers 7. Spacer walls are located at a given distance from axis XiXi relative to the diameters of orifices $O_1$, $O_2$, so as to minimize parasite reflections.

FIG. 5, which is a vertical sectional view of the module in FIG. 3, shows the internal structure of module 1 with its back wall 2, its front wall 3 and its thin intermediate partitions 4, 5. This figure also shows the $X_iX_i$ axes of the beams, the orifices $O_{oi}$, $O_{li}$ and $O_{3i}$ in each element making up the body of module 1.

Module 1 on the front wall 3 contains the front panel 6 provided with lenses $Op_i$ aligned on the center lines of the body 1. For manufacturing reasons, it is preferable to cover the module 1 with front panels 6, placed one on top of the other.

In assembling the circuits, the body 1 comprises attachment points 11 and contact surfaces 13 in a housing (not shown) on the back surface, and broaches 12 designed to fit in recesses 61 of the front element 6.

The optical module as shown in FIGS. 3, 4 and 5 is preferably made in the form of a body and a front element made by injection. The body 1, the structure of which is open at the sides, is made particularly in a mold provided with mobile parts inserted through the sides and defining the various partitions and walls in the module, and broaches corresponding to orifices in the front wall and in the various partitions, and the orifice in the back wall.

What is claimed is:

1. An optical module for a light barrier, comprising:
   at least one of an optoelectronic emission component and an optoelectronic reception component;
   an optical transmission device configured to focus the light, centered on an optical axis, and having an useful optical area with diameter D1 around the optical axis;
   a rear wall defining a rear wall orifice centered on the optical axis, the rear wall orifice having an diameter D3 around the optical axis wherein D3<D1; and
   a diaphragm positioned to block reflected light within a chosen reflection zone and comprising a first partition defining a first partition orifice centered on the optical axis between the rear wall and the transmission device, the first partition orifice having a diameter D2A wherein D3<D2A<D1.

2. The optical module according to claim 1, further comprising:
   another diaphragm comprising a second partition defining a second partition orifice centered on the optical axis between the transmission device and the first partition, the second partition orifice having a diameter D2B wherein D3<D2A<D2B<D1.

3. The optical module according to claim 1, wherein:

the first partition is connected to one of (a) a front wall and (b) a rear wall and another partition through spacers which are provided with walls located apart from the optical axis by a given distance relative to the diameters of the partition orifices so as to minimize parasitic reflections.

4. The optical module according to claim 1, further comprising:

a body formed of a front wall and a back wall separated by at least one partition provided with an orifice;

a front wall defining a front orifice located on the optical axis;

a front panel with at least one lens located on the optical axis fixed to the front wall; and at least one of a beam entry orifice and an beam exit orifice located on the optical axis, wherein the walls and partitions are connected together through spacers, said spacers comprising supportive walls aligned substantially parallel to the optical axis and configured to fixedly hold at least the front wall, the back wall, and said at least one partition in alignment along the optical axis.

5. The optical module according to claim 4, wherein the body comprises means for attaching the body to a housing.

6. The optical module according to claim 4, wherein the body comprises positioning broaches projecting forward from the front wall, and wherein the front panel comprises recesses corresponding to the broaches for positioning the front panel on the body.

7. The optical module according to claim 4, wherein the body and the front panel are made by injection molding.

* * * * *